United States Patent [19]

Sakamoto

[11] Patent Number: 5,726,268

[45] Date of Patent: Mar. 10, 1998

[54] METHYL METHACRYLATE POLYMER

[75] Inventor: Takashi Sakamoto, Niihama, Japan

[73] Assignee: Sumitomo Chemical Company, Limited, Osaka, Japan

[21] Appl. No.: 549,524

[22] Filed: Oct. 27, 1995

[30] Foreign Application Priority Data

Oct. 28, 1994 [JP] Japan .................. 6-265224

[51] Int. Cl.$^6$ ................ C08F 120/18; C08F 220/02; C08F 216/12; C08F 220/44

[52] U.S. Cl. ................ 526/329.7; 526/318.4; 526/307.7; 526/332; 526/342; 526/347

[58] Field of Search ............. 526/329.7, 307.7, 526/318.4, 332, 342, 237

[56] References Cited

U.S. PATENT DOCUMENTS

| | | | |
|---|---|---|---|
| 4,246,382 | 1/1981 | Honda et al. | 526/79 |
| 4,661,571 | 4/1987 | Kato et al. | 526/216 |
| 4,859,750 | 8/1989 | Kato et al. | 526/135 |
| 4,877,853 | 10/1989 | Siol et al. | |
| 5,185,405 | 2/1993 | Nishida | 525/228 |
| 5,300,601 | 4/1994 | Besecke et al. | |

FOREIGN PATENT DOCUMENTS

| | | |
|---|---|---|
| 0 212 980 | 3/1987 | European Pat. Off. . |
| 0212980 | 3/1987 | European Pat. Off. . |
| 0 245 647 | 11/1987 | European Pat. Off. . |
| 16 45 232 | 10/1970 | Germany . |
| A 48-095491 | 12/1973 | Japan . |
| 60-060112 | 4/1985 | Japan . |
| 2 019 856 | 11/1979 | United Kingdom . |
| 2019856 | 11/1979 | United Kingdom . |

*Primary Examiner*—Joseph L. Schofer
*Assistant Examiner*—Wu C. Cheng
*Attorney, Agent, or Firm*—Cushman Darby & Cushman IP Group of Pillsbury Madison & Sutro LLP

[57] ABSTRACT

The present invention is directed to methyl methacrylate polymer comprising methyl methacrylate units as a primary component, wherein the weight-average molecular weight of the polymer is in the range from 80,000 to 400,000, and the molecular weight between branching points calculated from the z-average molecular weight of the polymers is in the range from 30,000 to 1,000,000.

20 Claims, No Drawings

METHYL METHACRYLATE POLYMER

FIELD OF THE INVENTION

The present invention relates to a methyl methacrylate polymer, and more specifically to a methyl methacrylate polymer having a specific branched structure.

RELATED PRIOR ART

Methacrylate polymers have sufficient rigidity and excellent transparency and weather resistance, and thus go into a variety of applications through injection molding or extrusion; for example, as injection molded objects, such as lamp lenses and meter covers of automobiles, lenses of eyeglasses, and light guide members, or as extruded sheets, such as sign-boards and name-plates.

When polymers are molded in the melt flow state like injection molding or extrusion, it is desired that the polymers possess high flow property in the molding process and that the resulting molded objects have excellent physical properties including mechanical strength, heat resistance, and chemical resistance.

One method which lowers the molecular weight of a polymer for the enhanced flow property thereof, was previously proposed to fulfill such requirements described above.

Another known method for enhancing the flow property of a polymer without lowering its molecular weight is to add a copolymer component, such as an acrylate, to the polymer.

Known acrylic resins having a wider molecular weight distribution and thereby high chemical resistance are disclosed, for example, in Japanese Examined Patent Publication (Kokoku) Nos. 58-455, 58-15490, and 62-34046.

Japanese Unexamined Patent Publication (Kokai) No. 48-95491 discloses acrylic resins obtained by polymerizing methyl methacrylate previously swelled in powder of a non-melt crosslinked polymer having a gel fraction of not less than 15% and obtained by polymerizing methyl methacrylate with polyfunctional monomers.

Methacrylate polymers having smaller molecular weight for the enhanced flow property suffer lower chemical resistance and mechanical strength.

Addition of the larger amount of copolymer component, such as an acrylate, lowers the glass transition temperature and thereby the heat resistance of the resulting resin. This technique of adding the copolymer component accordingly has only a limited effect on the improvement in the various physical properties mentioned above.

Other proposed resins having a wide molecular weight distribution have a drawback of lower melt flow property.

The acrylic resins disclosed in Japanese Unexamined Patent Publication No. 48-95491 have a low melt flow property and are not suitably applied for molding in the molten state.

SUMMARY OF THE INVENTION

An object of the present invention is to provide an improved methacrylate resin having a high melt flow property under high shear rate condition, which determines the extrusion properties or injection molding properties, while maintaining a normal level for reduced viscosity used as a general index of molecular weight. The methacrylate resin of the present invention further possesses preferable melt tension as well as having excellent heat resistance, chemical resistance, and mechanical properties, which seem to compete with the melt flow property.

This and other objects and effects of the present invention will become apparent from the following description.

The present invention is directed to a methyl methacrylate polymer comprising methyl methacrylate unit as a primary component, wherein the weight-average molecular weight of the polymer is in the range from 80,000 to 400,000, and the molecular weight between branching points calculated from the z-average molecular weight of the polymer is in the range from 30,000 to 1,000,000.

DETAILED DESCRIPTION OF THE INVENTION

The polymer primarily composed of methyl methacrylate according to the present invention includes not less than 50% by weight of, preferably not less than 70% by weight of, structural unit of methyl methacrylate. As long as the polymer includes the methyl methacrylate unit of not less than 50% by weight, the methyl methacrylate unit may partially be replaced by a monofunctional unsaturated monomer unit, which is copolymerizable with methyl methacrylate. In the specification, the methyl methacrylate unit and the monofunctional unsaturated monomer unit put together may be referred to simply as 'the monofunctional structural unit', and monomer(s) which forms the monofunctional unit may be referred to simply as 'the monofunctional monomer'. The content of the copolymerizable, monofunctional unsaturated monomer unit in the polymer is preferably not less than 1% by weight, more preferably not less than 3% by weight, and most preferably 3 to 20% by weight.

The polymer also includes a polyfunctional structural unit of a predetermined amount, which makes the molecular weight between branching points in the z-average molecular weight of the polymer range from 30,000 to 1,000,000. The branches in the polymer are formed by the polyfunctional structural unit, more specifically by a terminal portion of the polyfunctional structural unit. Content of the polyfunctional structural unit depends on the proportion of the monomer which forms the polyfunctional structural unit, and the unit comprises most of the supplied monomer.

When the content of the methyl methacrylate unit in the polymer is less than 50% by weight, the polymer does not show sufficient transparency or mechanical strength, which is characteristic of poly(methyl methacrylate).

Examples of copolymerizable, monofunctional unsaturated monomer which forms the monofunctional unsaturated monomer unit include: methacrylates, such as ethyl methacrylate, propyl methacrylate, butyl methacrylate, and benzyl methacrylate; acrylates, such as methyl acrylate, ethyl acrylate, propyl acrylate, butyl acrylate, and 2-ethylhexyl acrylate; unsaturated carboxylic acids having one double bond and acid anhydrides thereof, such as acrylic acid, methacrylic acid, maleic acid, and itaconic acid; hydroxyl group-containing (meth)acrylates, such as 2-hydroxyethyl acrylate, 2-hydroxylpropyl acrylate, monoglycerol acrylate, 2-hydroxyethyl methacrylate, hydroxypropyl methacrylate, and monoglycerol methacrylate; (meth)acrylamides, such as acrylamide, methacrylamide, and diacetone acrylamide; (meth)acrylonitriles, such as acrylonitrile and methacrylonitrile; amino group-containing (meth)acrylates, such as dimethylaminoethyl methacrylate and dimethylaminoethyl acrylate; allyl ethers, such as allyl glycidyl ether; vinyl ethers, such as vinyl glycidyl ether; epoxy group-containing (meth) acrylates, such as glycidyl acrylate and glycidyl methacrylate; and vinylbenzenes such as styrene and α-methylstyrene.

The weight-average molecular weight (Mw) of the methyl methacrylate polymer of the present invention ranges from 80,000 to 400,000, preferably from 150,000 to 300,000.

The polymer having Mw of less than 80,000 has insufficient mechanical strength and chemical resistance.

The polymer having Mw of larger than 400,000, on the contrary, has low melt flow property and thereby undesirsbly poor molding properties.

In the methyl methacrylate polymer of the present invention, the molecular weight between branching points (Mzb) in the z-average molecular weight (Mz) is in the range from 30,000 to 1,000,000, preferably 40,000 to 400,000.

The polymer having Mzb of larger than 1,000,000 has low flow property under the high shear rate condition and low chemical resistance.

The polymer having Mzb of less than 30,000 has poor mechanical strength and appearance of the molded objects.

Mw and Mz are measured by using gel permeation chromatography (GPC) and a differential refractive index detector.

The process of measurement is, for example, described in page 24–55, 'Analysis of Polymer Characteristics' (edited by the Polymer Society of Japan, 1984, Kyoritsu Publishing Co., Ltd.).

The molecular weight between branching points represents an average molecular weight from a first branching point to a second branching point in the polymer having a branched structure.

In the present invention, the molecular weight between branching points is expressed by the value derived from Mz.

The molecular weight between branching points in the z-average molecular weight, Mzb, is calculated according to Equations 1 and 2 given below, based on the description of 'Characterization' (Bulletin of the Japan Rubber Association, Vol. 45, No. 2, page 105–118):

$$\{[\eta_1]/[\eta_2]\}^{10/6} = \{(1+Bz/6)^{0.5} + 4Bz/3\pi\}^{-0.5}$$ [Equation 1]

$$Mzb = Mz/Bz$$ [Equation 2]

wherein, $[\eta_1]$ represents intrinsic viscosity at the Mz value of the target polymer, which is calculated from the relationship between the absolute molecular weight and the intrinsic viscosity of the target polymer based on the universal calibration curve of GPC retention time and the product of the intrinsic viscosity and the molecular weight of standard linear methyl methacrylate polymer; $[\eta_2]$ shows the intrinsic viscosity of the standard linear methyl methacrylate polymer having a molecular weight identical with the Mz value of the target polymer; and Bz denotes the number of branching points in the z-average molecular weight Mz.

It is preferable that methyl methacrylate polymer of the present invention has a molecular weight distribution such that the proportion, expressed as % by weight, of the polymer having a molecular weight of not less than 300,000 is from (14×reduced viscosity(%)−6.8) to (14×reduced viscosity(%)+11.2) when the polymer has a reduced viscosity of not larger than 0.7, and from (40×reduced viscosity (%)−25) to (40×reduced viscosity(%)−7) when the polymer has a reduced viscosity of larger than 0.7, the reduced viscosities being measured in units of dl/g. Unless otherwise specified, in the description here, "molecular weight" represents a value calibrated against the molecular weight of linear methyl methacrylate polymer.

The reduced viscosity expressed in the present invention is a value measured in chloroform at 25° C. when the target polymer has a solution concentration of 1 g/dl.

When the fraction of polymer part having a molecular weight of not less than 300,000 is within the range specified above, the polymer has better-balanced flow property, chemical resistance, and mechanical strength.

The degree of crosslinking in the methyl methacrylate polymer of the present invention, expressed by the gel fraction (% by weight of the acetone-insoluble content to the total weight of polymer), is generally not larger than 3%, preferably not larger than 1%, more preferably about 0%.

The methyl methacrylate polymer of the present invention can be obtained by polymerizing the monofunctional monomer with a predetermined amount of a monomer, which forms polyfunctional structural unit, and further a chain transfer agent and/or a polymerization initiator according to the requirements.

The monomer which forms polyfunctional structural unit is usually a polyfunctional monomer. In the specification, the polyfunctional monomer means a monomer which has at least two double bonds in its molecule and is copolymerizeble with methyl methacrylate.

Content of the polyfunctional monomer is generally from 0.02 to 0.3%, preferably from 0.05 to 0.2% by weight in the polymer.

Examples of the polyfunctional monomer include: esters of ethylene glycol and of oligomers of ethylene glycol having two or more hydroxyl groups esterified by acrylic acid or methacrylic acid, such as ethylene glycol di(meth)acrylate, diethyene glycol di(meth)acrylate, triethylene glycol di(meth)acrylate, and tetraethylene glycol di(meth) acrylate; methacrylic or acrylic esters of bivalent alcohols, such as neopentyl glycol di(meth)acrylate, hexanediol di(meth)acrylate, and hutanediol di(meth)acrylate; esters of multivalent alcohols and derivatives thereof having two or more hydroxyl groups esterified by acrylic acid or methacrylic acid, such as trimethylolpropane dimethacrylate, trimethylolpropane diacrylate, pentaerythritol dimethacrylate and pentaerythritol diacrylate; and aryl compounds having two or more alkenyl groups, such as divinylbenzene.

Any known chain transfer agent generally used for polymerization of methyl methacrylate is applicable for the chain transfer agent. Chain transfer agents include monofunctional chain transfer agents having one chain transfer functional group and polyfunctional chain transfer agents having two or more chain transfer functional groups.

Examples of the monofunctional chain transfer agent include alkyl mercaptans and thioglycolates, whereas those of the polyfunctional chain transfer agent include multivalent esters of alcohols having hydroxyl groups esterified with thioglycolic acid or 3-mercaptopropionic acid. Such alcohols include ethylene glycol, neopentyl glycol, trimethylolpropane, di(trimethylolpropane), pentaerythritol, dipentaerythritol, tripentaerythritol, and sorbitol.

The polyfunctional chain transfer agent may act as the monomer which forms the polyfunctional structural unit, and in some cases, some part or all of the polyfunctional monomer can be replaced by the polyfunctional chain transfer agent.

Content of the chain transfer agent is generally $5 \times 10^{-4}$ mole to $5 \times 10^{-3}$ mole to 1 mole of the monofunctional monomer. Content of the polyfunctional monomer generally has functional groups of from $1 \times 10^{-5}$ to (chain transfer agent (mole)—$2.5 \times 10^{-4}$) equivalent per 1 mole of the monofunctional monomer.

The weight-average molecular weight of methyl methacrylate polymer generally depends upon the concentration of the polyfunctional monomer primarily used, the concentration of the chain transfer agent, and the concentration of the radical initiator.

The weight-average molecular weight increases with an increase in concentration of the polyfunctional monomer, and decreases with an increase in concentration of the chain transfer agent. The weight-average molecular weight is accordingly controlled by suitably varying the concentration of the polyfunctional monomer and that of the chain transfer agent in the ranges specified above.

The molecular weight between branching points is mainly controlled by the concentration of the polyfunctional monomer.

The molecular weight between branching points decreases with an increase in concentration of the polyfunctional monomer.

When polyfunctional chain transfer agent is used as the chain transfer agents, the molecular weight between branching points decreases compared with the case when the same amount of monofunctional chain transfer agent is used.

The ratio of the polymer part having a molecular weight of not less than 300,000 increases with an increase in concentration of the polyfunctional monomer.

Any known polymerization initiator generally used for polymerization of vinyl monomers is applicable for the polymerization initiator.

Polymerization initiators include monofunctional polymerization initiators generating a pair of radicals in one molecule and polyfunctional polymerization initiators generating two or more pairs of radicals.

When polymerization is concluded at the polymerization rate of 45 through 60% by weight as in the case of bulk polymerization, polyfunctional polymerization initiators having three or more functional groups effectively reduce the amount of unreacted vinyl groups with polyfunctional monomers, compared with the branching process only with the polyfunctional monomers.

Typical examples of the three-functional polymerization initiator and four-functional polymerization initiator are tris-(t-butylperoxy)triazine and 2,2-bis(4,4-di-t-butylperoxycyclohexyl)propane, respectively.

Content of the polymerization initiator may be a known appropriate amount according to the method of polymerization, and is generally from 0.001 to 1 part by weight, preferably from 0.01 to 0.7 part by weight, per 100 parts by weight of monofunctional monomer.

The polyfunctional polymerization initiator may act as the monomer which forms the polyfunctional structural unit, and in some cases, some part or all of the polyfunctional monomer can be replaced by the polyfunctional polymerization initiator.

The weight-average molecular weight of the methyl methacrylate polymer according to the present invention decreases with an increase in content of the polymerization initiator, like the conventional methyl methacrylate polymer.

The methyl methacrylate polymer of the present invention may be prepared by any known polymerization process for industrially manufacturing acrylic resins, for example, suspension polymerization, bulk polymerization, and emulsion polymerization.

As a reaction condition of the suspension polymerization, reaction temperature is usually in a range of approximately 60° to 90° C. Reaction time depends on the reaction temperature, and for example, the reaction reaches the peak after 1 to 1.5 hours at a reaction temperature range of 70° to 85° C. The temperature is increased to 100°–110° C. after the reaction peak, and the increased temperature is maintained for 10 to 30 minutes to complete the reaction. In order to lower the gel fraction, the reaction is preferably carried out in an inert atmosphere of nitrogen, helium, argon, or the like.

A variety of other agents generally used for acrylic resins, for example, mold parting agents, ultraviolet light absorbers, coloring agents, antioxidants, heat stabilizers, and plasticizers, may be added to the methyl methacrylate polymer of the present invention, according to the requirements.

Another acrylic resin may be added to the methyl methacrylate polymer of the present invention for better impact resistance and/or heat resistance, as long as it does not damage the effect of the present invention.

The methyl methacrylate polymer of the present invention has excellent mechanical properties including bending strength, tensile strength, chemical resistance, and heat resistance, while possessing preferable melt flow property under the high shear rate condition. The polymer of the present invention can be applied in a variety of molding applications, since molded objects prepared from the polymer effectively possess the required properties including rigidity, weather resistance, chemical resistance, and transparency. The polymer is, for example, suitably injection molded to form large-sized objects or products having thick-wall end portions. The polymer of the present invention has high stretch viscosity in the molten state, and accordingly is hard to cause melt-down in extrusion. The polymer of the present invention is thus suitable for contour extrusion and used as material having substantially uniform thickness in the process of forming extruded sheets under application of heat. Further, it is suitable for blow molding or for formed materials.

The present invention accordingly provides a methyl methacrylate polymer as hereinbefore defined in shaped form.

EXAMPLES

Polymers prepared in Examples and References were evaluated according to the following methods:

* MFR: The MFR (g/10 min) was measured under the load of 3.80 kg at 230° C. for 10 minutes in conformity with JIS K7210.

* Spiral flow length: Each resin obtained was injected with an injection molding machine (IS130F2-3AV manufactured by Toshiba Machine Co., Ltd.) into an ellipsoidal spiral flow mold having the thickness of 2 mm and the width of 10 mm and kept at 40° C., and the flow distance (cm) of the resin in the mold was measured. Conditions of the injection molding were the cylinder temperature of 280° C., the injection pressure of 820 kgf/cm$^2$, and the injection rate of 155 cm$^3$/sec.

* Chemical resistance: Each resin obtained was formed to a flat sheet of 150 mm×150 mm×3 mm with an injection molding machine (M140-SJ manufactured by Meiki Co., Ltd.) and a flat sheet die with a film gate. A sheet of 150 mm×25 mm×3 mm was cut from the flat sheet in the direction parallel to the injection flow.

The cut sheet was annealed at 80° C. under reduced pressure for 6 hours, and a sample piece was completed by applying adhesive cellophane tape to the short side face of the annealed sheet.

While one end of the sample piece was fixed by means of a cantilever beam, a load was applied to the other end of the sample piece with a support 6 cm apart from the fixed end. Isopropyl alcohol was applied to the surface of the sample piece at the support, and the load causing crazes at the time point of 100 seconds after the application was expressed by the stress (kgf/cm$^2$).

* Bending strength: The bending strength (kgf/cm$^2$) was measured in conformity with ASTM-D790.

* Tensile strength: The tensile strength (kgf/cm$^2$) was measured in conformity with ASTM-D638.

* Heat deflection temperature (HDT): HDT (°C.) was measured in conformity with ASTM-D648.

* Reduced viscosity (η sp/c): The reduced viscosity (dl/g) was measured at the concentration of 1 g/dl in chloroform solution at 25° C. in conformity with JIS Z8803.

* Weight-average molecular weight (Mw) and z-average molecular weight (Mz): Mw and Mz were measured with a gel permeation chromatography equipped with a differential refractive index detector and a viscometer (GPC150-CV manufactured by Waters Corp.), and obtained from the [molecular weight-retention time] calibration curve of standard linear methyl methacrylate polymer.

* Molecular weight between branching points in z-average molecular weight (Mzb): The intrinsic viscosity [η$_2$] of standard linear methyl methacrylate polymer having a molecular weight identical with the Mz value was obtained from the [molecular weight-retention time] calibration curve and the [intrinsic viscosity-retention time] calibration curve of the standard linear methyl methacrylate polymer. The intrinsic viscosity [η$_1$] corresponding to the Mz value was obtained from the [(absolute molecular weight×intrinsic viscosity)-retention time] universal calibration curve of the standard linear methyl methacrylate polymer. Mzb was then calculated according to Equations 1 and 2 given above.

Monomers and chain transfer agent used in Examples are given below:

EGDMA: ethylene glycol dimethacrylate

HDA: 1,6-hexanediol diacrylate

PETA: pentaerythritol tetraacrylate

EXAMPLE 1

In a 200-liter stainless autoclave, 96 parts by weight of methyl methacrylate, 4 parts by weight of methyl acrylate, 0.03 parts by weight of EGDMA, 0.3 parts by weight of lauroyl peroxide, 0.14 parts by weight of n-dodecylmercaptan, 200 parts by weight of ion-exchanged water, and 1 part by weight of poly(sodium methacrylate) were mixed and heated in a nitrogen atmosphere. Polymerization started at 80° C. After 90 minute-polymerization, the mixture was further polymerized at 100° C. for 60 minutes. After the polymerization, the mixture was washed, dehydrated, and dried to yield bead polymer. The polymer obtained was evaluated in the above manner. The results are shown in Table 1.

EXAMPLES 2–5

Comparative Examples 1–4

The respective polymers were obtained in the same manner as Example 1, except that the content of the chain transfer agent and the type and the content of the polyfunctional monomer included in the monomer mixture were varied according to Tables 1 and 2. The polymers obtained were evaluated in the above manner. The results are shown in Tables 1 and 2.

TABLE 1

| | Examples | | | | |
|---|---|---|---|---|---|
| | 1 | 2 | 3 | 5 | 6 |
| Chain transfer agent | | | | | |
| Parts by weight | 0.14 | 0.51 | 0.51 | 0.41 | 0.35 |
| (molar ratio) × 10$^{-4}$ | 6.7 | 25.5 | 25.5 | 20.4 | 17.3 |
| Polyfunctional monomer | | | | | |
| Type | EGDMA | HDA | HGDMA | EGDMA | PETA |
| Parts by weight | 0.030 | 0.23 | 0.015 | 0.079 | 0.088 |
| (Group molar ratio) × 10$^{-4}$ | 3.0 | 20 | 1.5 | 8.0 | 10.0 |
| Weight-average molecular weight × 10$^3$ | 320 | 180 | 90 | 150 | 278 |
| Reduced viscosity (dl/g) | 1.60 | 0.73 | 0.47 | 0.71 | 0.88 |
| (Molecular weight between branching points in Mz) × 10$^3$ | 350 | 48 | 710 | 123 | 54 |
| Molecular weight of not less than 300,000 (%) | | | | | |
| Value obtained | 40.5 | 14.8 | 0.6 | 7.4 | 23.4 |
| Upper limit | 57.0 | 22.2 | 17.7 | 21.4 | 28.2 |
| Lower limit | 39.0 | 4.2 | -0.2 | 3.4 | 10.2 |
| MFR(g/10 min.) | 0.1 | 2.8 | 11.1 | 2.5 | 1.4 |
| Spiral flow length (cm) | 42.3 | 76.2 | 89.3 | 66.6 | 63.4 |
| Chemical resistance (Kgf/cm$^2$) | 480 | 376 | 120 | 391 | 407 |
| Tension resistance (Kgf/cm$^2$) | 727 | 695 | 680 | 714 | 688 |
| Bending strength (Kgf/cm$^2$) | 1240 | 1187 | 1180 | 1200 | 1180 |

TABLE 2

| | Comparative Examples | | | |
|---|---|---|---|---|
| | 1 | 2 | 3 | 4 |
| Chain transfer agent | | | | |
| Parts by weight | 0.27 | 1.1 | 0.82 | 0.32 |
| (molar ratio) × 10$^{-4}$ | 13.3 | 54.4 | 40.6 | 15.8 |
| Polyfunctional monomer | | | | |
| Type | EDGMA | HDA | — | — |
| Parts by weight | 0.0009 | 0.35 | — | — |
| (Group molar ratio) × 10$^{-4}$ | 0.09 | 35.3 | — | — |
| (Weight-average molecular weight) × 10$^3$ | 168 | 247 | 72 | 151 |
| Reduced viscosity (dl/g) | 0.90 | 0.87 | 0.36 | 0.81 |
| (Molecular weight between branching points in Mz) × 10$^3$ | 1260 | 28 | ∞ | ∞ |

TABLE 2-continued

|  | Comparative Examples | | | |
|---|---|---|---|---|
|  | 1 | 2 | 3 | 4 |
| Molecular weight of not less than 300,000 (%) | | | | |
| Value obtained | 10.4 | 28.2 | 2.4 | 5.8 |
| Upper limit | 29.0 | 27.8 | 16.24 | 25.4 |
| Lower limit | 11.0 | 9.8 | −1.8 | 7.4 |
| MFR (g/10 min.) | 1.4 | 1.6 | 38 | 2.1 |
| Spiral flow length (cm) | 56.6 | 105 | 95 | 62.4 |
| Chemical resistance (Kgf/cm$^2$) | 242 | 164 | 115 | 200 |
| Tension resistance (Kgf/cm$^2$) | 707 | 410 | 340 | 700 |
| Bending strength (Kgf/cm$^2$) | 1210 | 660 | 425 | 1190 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A methyl methacrylate polymer comprising methyl methacrylate unit as a primary component, wherein the weight-average molecular weight of the polymer is in the range from 80,000 to 400,000, and the molecular weight between branch point calculated from the z-average molecular weight of the polymer is in the range from 30,000 to 1,000,000 and a branch point is formed by 0.02 to 0.3% by weight of a polyfunctional structural unit.

2. The methyl methacrylate polymer according to claim 1, wherein the molecular weight distribution of the polymer is such that the proportion, expressed as % by weight, of the polymer having a molecular weight of not less than 300,000 is from (14×reduced viscosity (%)−6.8) to (14×reduced viscosity(%)+11.2) when the polymer has a reduced viscosity of not larger than 0.7, and from (40×reduced viscosity (%)−25) to (40×reduced viscosity(%)−7) when the polymer has a reduced viscosity of larger than 0.7, the reduced viscosities being measured in units of dl/g.

3. The methyl methacrylate polymer according to claim 1, wherein said methyl methacrylate polymer comprises methyl methacrylate units in an amount of not less than 50% by weight.

4. The methyl methacrylate polymer according to claim 3, wherein said methyl methacrylate polymer comprises methyl methacrylate units in an amount of not less than 70% by weight.

5. The methyl methacrylate polymer according to claim 2, wherein said methyl methacrylate polymer further comprises a monofunctional unsaturated monomer unit copolymerizable with methyl methacrylate in an amount of not less than 1% by weight.

6. The methyl methacrylate polymer according to claim 5, wherein the amount of the monofunctional unsaturated monomer unit is not less than 3% by weight.

7. The methyl methacrylate polymer according to claim 6, wherein the amount of the monofunctional unsaturated monomer unit is in the range from 3 to 20% by weight.

8. The methyl methacrylate polymer according to claim 1, wherein the amount of the polyfunctional structural unit is in the range from 0.05 to 0.2% by weight.

9. The methyl methacrylate polymer according to claim 5, wherein the monofunctional unsaturated monomer unit copolymerizable with methyl methacrylate is derived from at least one selected from the group consisting of a (meth)acrylate, an unsaturated carboxylic acid having one double bond and an acid anhydride thereof, a (meth)acrylamide, a (meth)acrylonitrile, an allyl ether, a vinyl ether, and a vinylbenzene.

10. The methyl methacrylate polymer according to claim 1, wherein said polyfunctional structural unit is derived from at least one selected from the group consisting of a polyfunctional monomer copolymerizable with methyl methacrylate, a polyfunctional chain transfer agent, and a polyfunctional polymerization initiator.

11. The methyl methacrylate polymer according to claim 10, wherein the polyfunctional monomer comprises at least one selected from the group consisting of an ester of ethylene glycol and an ester of ethylene glycol oligomer having two or more hydroxyl groups esterified with (meth)acrylic acid, an ester of bivalent an alcohol having hydroxyl groups esterified with (meth)acrylic acid, an ester of an multivalent alcohol and a derivatives thereof having two or more hydroxyl groups esterified with (meth)acrylic acid, and anaryl compound having two or more alkenyl groups.

12. The methyl methacrylate polymer according to claim 10, wherein the polyfunctional chain transfer agent is an ester of a multivalent alcohol having hydroxyl groups esterified with thioglycolic acid or 3-mercaptopropionic acid.

13. The methyl methacrylate polymer according to claim 10, wherein the polyfunctional polymerization initiator is a three-functional or four-functional polymerization initiator.

14. The methyl methacrylate polymer according to claim 13, wherein the three-functional or four-functional polymerization initiator is tris-(t-butylperoxy)triazine or 2,2-bis(4, 4-di-t-butylperoxycyclohexyl)propane.

15. The methyl methacrylate polymer according to claim 1, wherein said methyl methacrylate polymer has a weight-average molecular weight in the range from 150,000 to 300,000.

16. The methyl methacrylate polymer according to claim 1, wherein said methyl methacrylate polymer has a gel fraction representing the proportion of acetone-insoluble content by total weight of the polymer, of not larger than 3%.

17. The methyl methacrylate polymer according to claim 16, wherein said methyl methacrylate polymer has a gel fraction of not larger than 1%.

18. The methyl methacrylate polymer according to claim 17, wherein said methyl methacrylate polymer has a gel fraction of about 0%.

19. The methyl methacrylate polymer according to claim 1, wherein said methyl methacrylate polymer has a molecular weight between branch calculated from the z-average molecular weight of the polymer in the range from 40,000 to 400,000.

20. A methyl methacrylate polymer according to claim 1 in shaped form.

* * * * *